United States Patent
Hörtner et al.

(10) Patent No.: US 11,487,494 B2
(45) Date of Patent: Nov. 1, 2022

(54) SYSTEM FOR DISPLAYING AN OPTICAL IMAGE

(71) Applicant: Ars Electronica Linz GmbH & Co KG, Linz (AT)

(72) Inventors: Horst Hörtner, Kleinzell (AT); Hideaki Ogawa, Linz (AT); Peter Holzkorn, Linz (AT)

(73) Assignee: ARS ELECTRONICA LINZ GMBH & CO KG, Linz (AT)

( * ) Notice: Subject to any disclaimer, the term of this patent is extended or adjusted under 35 U.S.C. 154(b) by 58 days.

(21) Appl. No.: 17/055,785

(22) PCT Filed: May 15, 2019

(86) PCT No.: PCT/AT2019/060163
§ 371 (c)(1),
(2) Date: Nov. 16, 2020

(87) PCT Pub. No.: WO2019/222775
PCT Pub. Date: Nov. 28, 2019

(65) Prior Publication Data
US 2021/0255817 A1    Aug. 19, 2021

(30) Foreign Application Priority Data

May 23, 2018    (AT) .................................. 50099/2018

(51) Int. Cl.
| G06F 3/14 | (2006.01) |
| B64C 39/02 | (2006.01) |
| G05D 1/02 | (2020.01) |

(52) U.S. Cl.
CPC .......... *G06F 3/1446* (2013.01); *B64C 39/024* (2013.01); *G05D 1/0297* (2013.01); *B64C 2201/143* (2013.01)

(58) Field of Classification Search
CPC ............. G06F 3/1446; B64C 2201/143; B64C 39/024
See application file for complete search history.

(56) References Cited

U.S. PATENT DOCUMENTS

| 9,415,869 B1* | 8/2016 | Chan ....................... G05D 1/104 |
| 2011/0304633 A1* | 12/2011 | Beardsley .............. B25J 9/1666 |
| | | 345/474 |
| 2017/0137125 A1* | 5/2017 | Kales .................... B64C 39/024 |

OTHER PUBLICATIONS

International Search Report, English Translation, issued in Application PCT/AT2019/060163, dated Aug. 14, 2019.
(Continued)

*Primary Examiner* — Nelson M Rosario
*Assistant Examiner* — Scott D Au
(74) *Attorney, Agent, or Firm* — Workman Nydegger

(57) ABSTRACT

A system (1) for displaying an optical image (2) by means of unmanned autonomous vehicles. Each vehicle has a display for displaying at least a part of the image (2) by way of stored or transmitted image information as well as a control unit (9). The control unit (9) is configured to control the image information and to move the vehicle using a drive unit (11) by means of stored or transmitted positon information. At least two vehicles are configured as land crafts (5), wherein the displays (3) of the land crafts (5) are oriented in parallel to a substantially horizontal image plane (6) and configured as displays (3) accessible by a human person.

12 Claims, 2 Drawing Sheets

(56) References Cited

OTHER PUBLICATIONS

Javier Alonso-Mora et al, Image and animation display with multiple mobile robots, May 1, 2012, International Journal of Robotics Research, 753-773, 31/6.

* cited by examiner

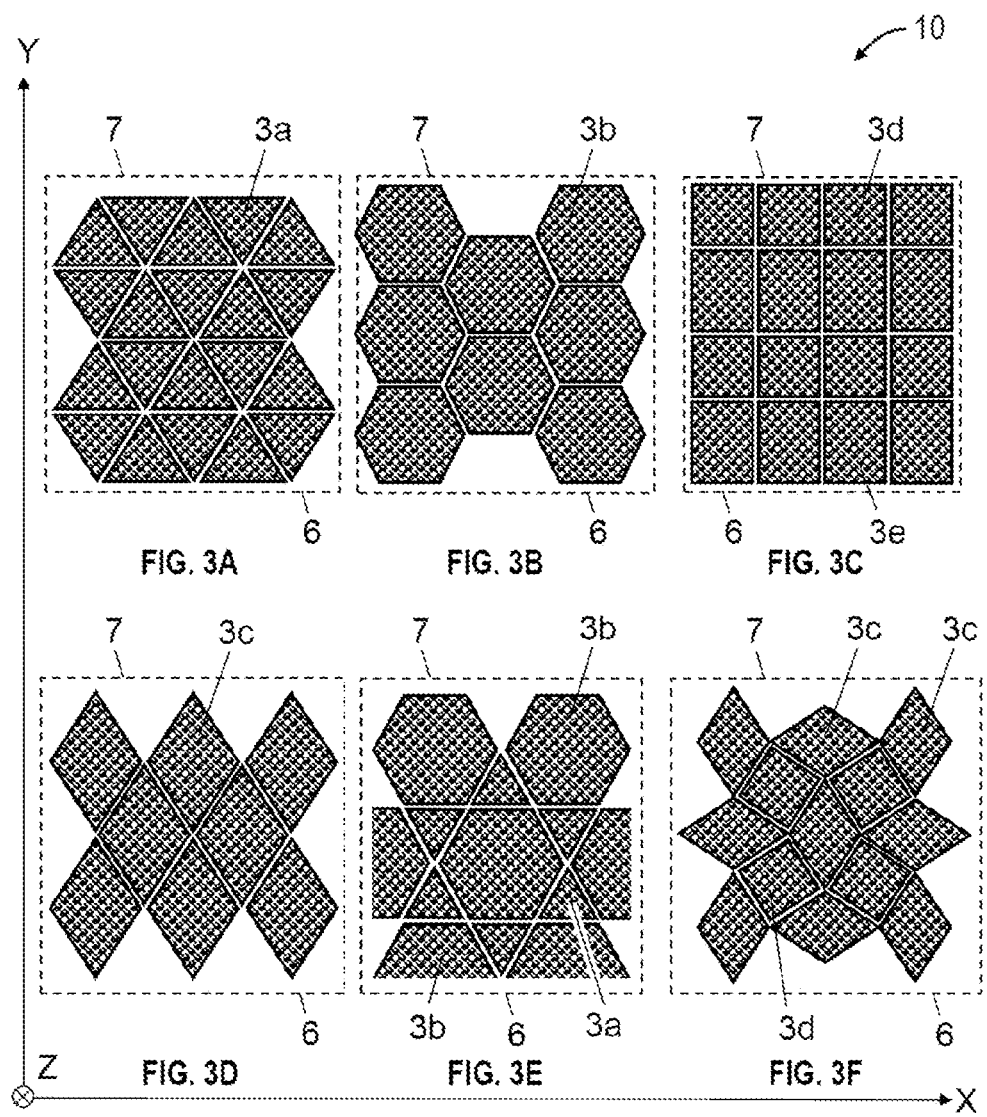

SYSTEM FOR DISPLAYING AN OPTICAL IMAGE

The present application is a U.S. National Stage of International Application No. PCT/AT2019/060163, filed on May 15, 2019, designating the United States and claiming the priority of Austria Patent Application No. A 8012/2019, Conversion Application No. GM 50099/2018 filed with the Austrian Patent Office on May 23, 2018. All of the aforementioned applications are incorporated herein in their respective entireties by this reference.

The invention relates to a system for displaying an optical image by means of unmanned autonomous vehicles, wherein each vehicle has a display for displaying at least a part of the image by means of stored or transmitted image information as well as a control unit, wherein the control unit is configured to control the image information and to move the vehicle using a drive unit by means of stored or transmitted position information.

From prior art there have been known systems, which enable the presentation of an image in airspace by means of so-called "drones", which are also called "Unmanned Aerial Vehicle (UAV)". The presentation of such images is of particular interest in the course of sport events or comparable public or private events in.

U.S. Pat. No. 9,415,869 B1 discloses a system having a plurality of UAVs, which each support a display vertically oriented in the operational position and may form a combined larger display by means of the coordinated formation of these displays. The displays as well as the support construction thereof have to be especially light-weight and, consequently, delicate, as the load capacity of the UAVs is low. The disadvantage with this system is that the displays may only be viewed, for example, in a sports stadium, from one side at the same time and that this system will only allow for an interaction with persons, for example artists or presenters, in a rather limited way.

The invention is based on the task to provide a system for displaying an optical image, which at least reduces the above disadvantages and/or limitations.

According to the invention, this task is solved by a system, wherein at least two vehicles are configured as land crafts, wherein the displays of the land crafts in the operational position are oriented in parallel to a substantially horizontal image plane and are configured as displays accessible by a human person.

The system according to the invention is advantageously able to present the optical image by means of the displays substantially horizontally near the ground, whereby, for example, the image may be viewed on the playing field of a sports stadium from all sides at the same time and is clearly better visible from the spectator tiers. Furthermore, the displays may be accessed by persons, for example by artists or presenters, allowing for an improved and increased interaction with these persons.

In a preferred embodiment the displays of the land crafts have the geometrical form of an equilateral polygon and may be moved by means of the land crafts and the control units into at least one substantially seamlessly parquetted stage assembly, in which stage assembly the displays form at least one accessible and/or walk-on stage. Thus, advantageously, one or several movable and variable interactive stages may be provided, which may be accessed and walked on by persons and artists.

The displays usefully have in the image plane the geometrical form of a regular hexagon, an equilateral triangle and/or a rhomb. These geometrical forms allow for a good and simple seamless parquetting.

The term "parquetting" is known to those skilled in the art as "tiling", "paving" or "scrap-free blanking".

In a further preferred embodiment the system has a control station, which is configured to move the vehicles and/or to control the image information, wherein the control units and/or the control station is/are configured to control the image information on the basis of the position information of the associated vehicle and/or on the basis of the position information of the further vehicles. The image information, which is displayed by a display, may thus be adjusted to the respective position or to an image position of the respective vehicle.

The position information and the image information are preferably temporally variable information, wherein the control units and/or the control station is/are configured to control the image information substantially in real time by way of the variation of the position information. In this way, on the one hand side, there may be displayed films and/or animations by the displays and, on the other side, this image information may be adjusted substantially in real time to the current position of the vehicle in a scheduled manner, for example by way of a predefined path the vehicle follows, or in an unscheduled manner, for example if the vehicle has to carry out an obstacle avoidance manoeuvre.

The display is usefully configured as an integral part of a housing of the land craft and/or to be weather-proof.

A land craft, preferably all land crafts, is/are usefully configured as robot vehicle(s) and/or with mecanum wheels.

At least one land craft, preferably all land crafts, usefully has/have orientation means for adjusting the orientation of the display to the display plane.

In a preferred embodiment at least one vehicle is configured as an unmanned aerial vehicle, in particular a UAV/drone, a balloon or an airship, and/or at least one vehicle is configured as an unmanned water craft, in particular a water drone, a submarine drone or a marine buoy.

In a further preferred embodiment the vehicles form at least one swarm flight formation, wherein the control units and/or the control station is/are configured to move the vehicles in a swarm flight formation, in particular by means of swarm flight formation units of the vehicles.

Further exemplary embodiments of the invention are described by way of the following figures, wherein in a schematic depiction:

FIG. 3A to 3F show in a bird's eye view examples of stage assemblies having seamless parquetting with a system according to the invention.

Figure 1:
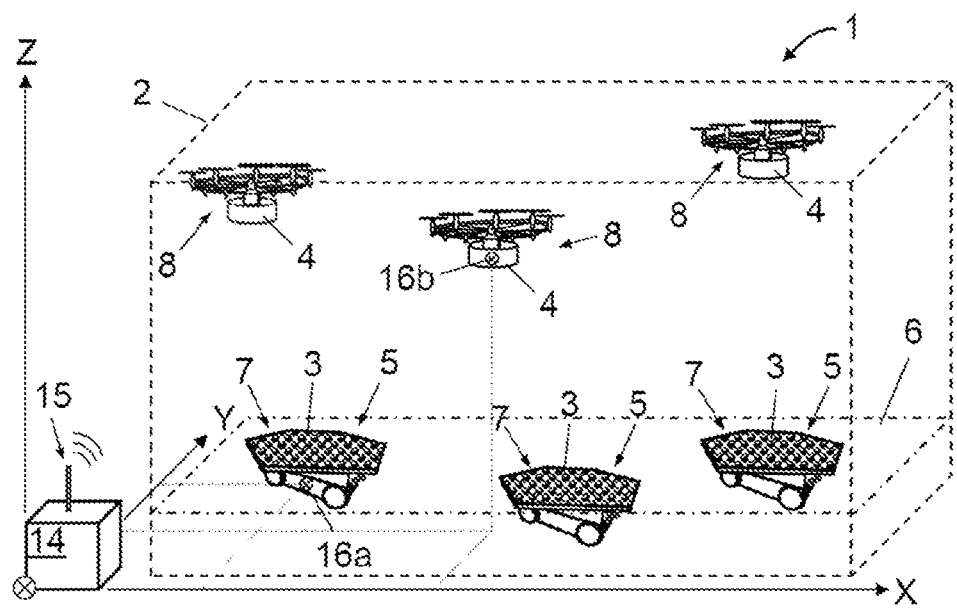
FIG. 1 shows an inventive system according to a first exemplary embodiment.

FIG. 1 shows in a schematic depiction a system 1 according to a first exemplary embodiment of the invention for providing an optical image 2. The image 2 is presented by means of displays 3 by way of stored or transmitted image information. The displays 3 may be composed of a number of image points/pixels and may be based on at least one of the following technologies: LCD, LED, OLED, Quantum Dot, "In-Glass". Each display/all displays 3 may present the entire image 2, which means that all displays 3 present the same, namely the image 2. Alternatively, all displays 3 may together present the image 2, for example, by each display 3 presenting a particular part of the image 2, wherein the sum of all parts, this is of all displays 3, forms the entire image 2. Alternatively and/or additionally, two or several displays 3 may present a particular part of the image 2 and/or different images 2.

Furthermore, a part of the image 2, as depicted as an example in FIG. 1, may be presented in addition by means of light elements 4, for example, by semi-permeable screens illuminated by light sources (LED, LASER).

The above/further possibilities of presentation of an image in the sense of this invention are known to those skilled in the art.

Figure 2:
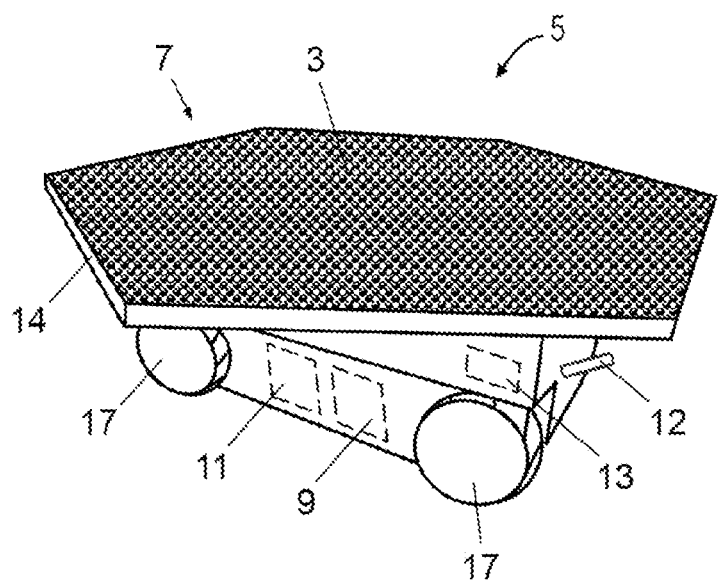
FIG. 2 shows an inventive land craft of the system according to FIG. 1.

The displays 3 and the light elements 4 are supported by unmanned autonomous vehicles and positioned and/or moved within space by way of stored or transmitted position information. The system 1 according to FIG. 1 has three unmanned autonomous vehicles, which are configured as land crafts 5. Such a land craft 5 is schematically detailed in FIG. 2. The displays 3 of the land crafts 5 are oriented in the operational position in parallel to a substantially horizontal image plane 6. Furthermore, the displays 3 of the land crafts 5 may be walked on by a human person, whereby each display 3 or a stage assembly 20 of several displays 3 may form an accessible and/or walk-on stage 7. The displays 3 may be configured as an integral part of a housing 14 of the land craft 5 and/or to be weather-proof. The land craft 5 may be configured as an autonomously driving robot vehicle and/or with mecanum wheels 17, whereby the robot vehicle may autonomously move in all directions, without having to take into account a "turning circle". The land craft 5 may further have orientation means, for example pneumatic pistons for lifting and lowering (not depicted), in order to adjust the orientation of the displays 3 to the image plane 6, whereby, for example, an inclined ground may be compensated for.

Furthermore, the system 1 according to FIG. 1 has three unmanned autonomous aerial vehicles, so-called UAVs 8. The UAVs 8 may be multicopters, for example "octocopters" having eight rotor units or "quadcopters" having four rotor units, wherein there is possible substantially any number of rotor units. Alternatively or additionally, the system 1 may have at least one further vehicle from the following list: an unmanned aerial vehicle, in particular a balloon or an airship, or an unmanned water craft, in particular a water drone, a submarine drone or a marine buoy. All these different vehicles of the system 1 may each have one or several displays, light elements or other units for supporting the entire optical image by the system 1.

The vehicles, this is the land crafts 5 and the UAVs 8, comprise a control unit 9 for controlling the image information and for moving the vehicle using a drive unit 11, for example an electric motor, by way of the position information. The control unit 9 may be composed of several components, wherein each component is configured to execute a function. For storing the position information and/or the image information, the vehicle and/or the control unit 9 may have a storage unit (not depicted). For receiving the position information and/or the image information, the vehicle and/the control unit 9 may have a communication unit 12. For determining and/communicating the position information, the vehicle and/or the control unit 9 may have at least one position sensor 13.

The at least one position sensor 13 may be at least one from the following list: inertial measuring unit for path, distance and/or position, acceleration sensor, position sensor, capacitive sensor for path, distance and/or position, laser sensor for path, distance and/or position, confocal sensor system for path, distance and/or position, magneto-inductive distance sensor, hall effect sensor for position, GPS receiver or receiver for a comparable satellite-based navigation system, for example Galileo, GLONASS or Beidou/Compass.

The system 1 according to FIG. 1 comprises a ground-based control station 14 having a communication unit 15. By means of the control station 14, the vehicles, this is the land crafts 5 and the UAVs 8, may be moved, and the presentation of the respective image information of the displays 3 may be controlled. Thereby, the control station 14 communicates via the communication units 12 and 15 with the control units 9. The control station 14 may comprise at least one from the following list: PC, laptop, tablet computer and smart phone. The control station 14 may have at least one user interface, wherein a user (not depicted) may control the vehicles and/or the image via the user interface.

A user may, for example via the user interface, manually start the execution of a presentation of the image 2. Subsequently, the execution of the presentation of the image 2 is realized automatically. The position information and the image information are processed automatically, for example, by means of the control units 9 and/or the control station 14 by way of a programme code.

The control units 9 and/or the control station 14 is/are configured to move the vehicles according to the position information, for example the image position 16a of a land craft 5 in FIG. 1, and to present at the respective image positions, for example at the image position 16a, via the display 3 the respective image information. The image information and the position information are calculated by the control station 14 and/or the control units 9 and optionally transmitted via the communication units 12 and 15.

Alternatively or additionally, a part of or the entire image information and/or position information may be stored in the storage unit and processed by the control units 9. If all image information and/or position information are stored in the storage unit of the vehicles, there is optionally no control station 14 required.

In FIG. 1, the image positions, for example 16a and 16b, are based on relative coordinates, which are defined along three virtual spatial axes X, Y and Z. This is of advantage in particular in the case of indoor applications within buildings. A vehicle is moved on the basis of the position information to an image position, for example 16a or 16b, which is calculated by the control station 14, the control unit 9 and/or the position sensor 13, for example an inertial measuring unit. In the following, the vehicle may be moved along a spatial or temporal sequence of image positions, which may be based on a predetermined route or a predetermined "path".

Alternatively, the position information may be absolute coordinates such as, e.g., "Global Positioning System (GPS)"—based coordinates, for example, data in the GPS Exchange Format (GPX). The data in the GPX format may contain geodata, this is the geographic coordinate latitude, longitude and elevation. Alternatively, the data may also be based on Galileo, GLONASS, Beidou/Compass or any other satellite-based navigation and/or time system or on a local or building-based navigation system. For this purpose, the vehicle may use a position sensor 13 of the type mentioned above in order to always compare the current position or image position of the vehicle with the predefined position or image position.

The image position may be spatially static, which may mean that the position information during the presentation of the image 2 or after all vehicles have reached their image position, respectively, contains only static information. In this way, the vehicles maintain their image position during the entire presentation of the image 2. Alternatively, the position information may have dynamic information, which may mean that one, several or all image position/s varies/vary during the presentation of the image 2. Alternatively, the position information may have static and dynamic information.

The image information may have only static information, which may mean that the displays 3 display the same image 2, for example a picture, or the same part of the image 2 during the entire presentation of the image 2. Alternatively, the image 2 may have dynamic information, for example a video or an animation. The displays 3 may then display, for example, a particular part of the image 2 or a particular frame at a particular point of time. Alternatively, the image 2 may be a combination of one or several images with one or several videos.

The displayed content of one, several or all displays 3 may depend on the image position or may be adjusted thereto, which is why the displayed content of a display 3 may be based on the position information of the associated vehicle and/or the position information of the further vehicles of the system 1. For example, the displayed content of one, several or all displays 3 may be respectively only a particular part of the image 2, wherein this particular part, which is displayed by the display(s) 3, depends on the current image position(s). Thus it may appear that a land craft 5, for example, "moves through the image", wherein the display 3 of the land craft 5 apparently "moves through the image plane 6" and respectively shows that part of the image 2, which currently correlates with the image position.

The image information and the position information may be calculated and/or transmitted substantially in real time, whereby there is ensured a smooth communication and wherein optionally the information regarding an image position and/or regarding the displayed part of the image 2 may be updated at any given point of time, for example by way of a scheduled or unscheduled variation of the image position.

The control station 14 and/or the control units 9 may be additionally configured to transmit time code signals via the communication units 12 and/or 15 in order to carry out a time code synchronization of the image information and/or of the position information. This is of particular importance if the image information and the position information comprise a combination of dynamic position information and dynamic image information. Based on the actual time code signal, the respective control unit 9 decides, which image information, for example which frame of the video data, will be displayed on the display 3. In addition, there may be realized a time code synchronization between the individual vehicles, in particular if there is no control station 14. Alternatively, a time code synchronization may be obtained by reading the time codes from a global time code synchronization source, for example GPS or DGPS, which is available to all vehicles. Alternatively, there may be obtained a time code synchronization by all vehicles being manually synchronized at the beginning.

In an alternative embodiment the vehicles form at least one swarm flight formation. For this purpose, the vehicles may have a swarm flight formation control unit (not depicted) and position sensors 13, in particular a plurality of distance sensors, wherein the position sensors 13 permanently detect the distance to the neighbouring vehicles substantially in real time. These swarm flight formation control units may communicate with the control units 9 of the vehicles, or they may be integrated into these. The control station 14 and/or the control units 9 may then update substantially in real time the position information and/or the image information via feedback of the position sensors 14 and may move the vehicles according to swarm flight formation intelligence. Those skilled in the art will know the basic principles of swarm flight formation intelligence.

The displays 3 of the land crafts 5 have preferably the geometrical form of an equilateral polygon. By means of the land crafts 5 and the control units 9, at least two of these displays 3 may be moved into one substantially seamlessly parquetted image assembly 10, in which image assembly 10 the displays 3 form an accessible and/or walk-on stage 7. Examples of such stage assemblies 10 having a seamless parquetting, which may be obtained using the land crafts 5 of a system according to the invention, are depicted in the FIGS. 3A to 3F. Thereby, the displays 3 have in the image plane 6 the geometrical form of an equilateral triangle 3a, of a regular hexagon 3b, of a rhomb 3c, of a square 3d and/or of a rectangle 3e. The displays 3a, 3b, 3c, 3d and/or 3e form a stage 7 that may be accessed/walked on by a person, which is oriented substantially horizontally and in parallel to the image plane 6. Alternatively or additionally, there may be formed several movable and variable interactive stages 7, which may, for example, be accessed or walked on by persons and artists, wherein the image 2 interacts with the persons, it "reacts" to the movements thereof, for example.

There is to be further noted that a system according to the invention may also be used for other applications, for example rescue missions. Unmanned land crafts 5 and/or UAVs 8 may be configured by means of a display 3 and/or a light means 4 for the signalling or information display for persons in danger and/or injured. Unmanned water vehicles (not depicted) may form, by means of displays 3 according to the invention, which are movable according to the above description into an accessible platform, a rescue platform on water in order to offer a temporary floating life raft for persons seeking help and/or being injured.

The invention claimed is:

1. A system for displaying an image by means of unmanned autonomous vehicles, wherein each vehicle includes a display for displaying at least a part of the image by way of stored or transmitted image information and a control unit, wherein the control unit is configured to control the image information and to move the vehicle using a drive unit by means of stored or transmitted position information, wherein
at least two vehicles are configured as land crafts, wherein the displays of the land crafts in an operational position are oriented in parallel to a substantially horizontal image plane and configured to be accessible by a human person,
wherein the displays of the land crafts have a geometrical form of an equilateral polygon and are moved by means of the land crafts and the control units into at least one substantially seamlessly parquetted stage assembly, wherein the display form at least one accessible and/or walk-on stage in the stage assembly.

2. The system according to claim 1, wherein the displays in the image plane have the geometrical form of a regular hexagon, an equilateral triangle and/or a rhomb.

3. The system according to claim 1, wherein the system includes a control station, wherein the control station is configured to move the vehicles and/or to control the image information, wherein the control units and/or the control station is/are configured to control the image information based on the position information of the associated vehicle and/or based on the position information of the other vehicles.

4. The system according to claim 3, wherein the position information and the image information are temporally variable information, wherein the control units and/or the control station is/are configured to control the image information substantially in real time by way of the variation of the position information.

5. The system according to claim 3, wherein the vehicles form at least one swarm flight formation, wherein the control units and/or the control station is/are configured to move the vehicles in a swarm flight formation.

6. The system of claim 5, wherein the control units and/or the control station is/are configured to move the vehicles in the swarm flight formation by means of swarm flight formation control units included in the vehicles.

7. The system according to claim 1, wherein, for each of the land crafts, the display of the land craft is an integral part of a housing of the land craft and/or configured to be weather-proof.

8. The system according to claim 1, wherein the land crafts are configured as robot vehicles and/or have mecanum wheels.

9. The system according to claim 1, wherein each of the land crafts includes an orientation means for adjusting an orientation of the display image plane.

10. The system according to claim 1, wherein at least one of vehicles is configured as an unmanned aerial vehicle, a balloon or an airship, and/or at least one of the vehicles is configured as an unmanned water craft, a submarine drone or a marine buoy.

11. The system according to claim 10, wherein the unmanned aerial vehicle is a UAV/drone.

12. The system according to claim 10, wherein the unmanned water craft is a water drone.

* * * * *